(12) United States Patent
Hattori et al.

(10) Patent No.: US 8,135,692 B2
(45) Date of Patent: Mar. 13, 2012

(54) INFORMATION RETRIEVAL APPARATUS AND COMPUTER PROGRAM

(75) Inventors: Gen Hattori, Fujimino (JP); Fumiaki Sugaya, Fujimino (JP)

(73) Assignee: KDDI Corporation, Tokyo (JP)

( * ) Notice: Subject to any disclaimer, the term of this patent is extended or adjusted under 35 U.S.C. 154(b) by 672 days.

(21) Appl. No.: 12/273,278

(22) Filed: Nov. 18, 2008

(65) Prior Publication Data

US 2009/0132525 A1    May 21, 2009

(30) Foreign Application Priority Data

Nov. 21, 2007   (JP) .................................. 2007-301984

(51) Int. Cl.
    *G06F 17/30* (2006.01)
(52) U.S. Cl. .................... 707/705; 707/729; 707/730
(58) Field of Classification Search .................. None
    See application file for complete search history.

(56) References Cited

U.S. PATENT DOCUMENTS

| | | | | |
|---|---|---|---|---|
| 7,409,382 B2* | 8/2008 | Kido | ....................................... | 1/1 |
| 7,827,503 B2* | 11/2010 | Jang | ............................... | 715/769 |
| 2004/0133560 A1* | 7/2004 | Simske | .............................. | 707/3 |
| 2007/0116430 A1* | 5/2007 | Yamamoto | ....................... | 386/95 |
| 2008/0109415 A1* | 5/2008 | Yabe et al. | ......................... | 707/3 |

FOREIGN PATENT DOCUMENTS

| | | |
|---|---|---|
| JP | 10-334115 | 12/1998 |
| JP | 2006-146627 A | 6/2006 |
| JP | 2006-236221 A | 9/2006 |
| KR | 10-2002-0072092 A | 9/2002 |
| KR | 10-2007-0013977 | 1/2007 |

OTHER PUBLICATIONS

Masaru Suzuki et al., "Successive Information Retrieval Method with Pen-based Interaction based on Estimation of User Intention," 2006 Proceedings of Interaction, Mar. 2006, pp. 101-108. (with English Abstract).

Yasuto Ishitani et al., "Web Access Method Based on Chaining Search and Neighboring Search," IEICE Notes, *The Institute of Electronics, Information and Communication Engineers*, Jul. 2006, pp. 31-36.

* cited by examiner

*Primary Examiner* — Hung Q Pham

(74) *Attorney, Agent, or Firm* — Morgan, Lewis & Bockius LLP

(57) ABSTRACT

An information retrieval apparatus for retrieving a web page using a retrieval keyword includes a word extract portion for extracting an objective word from the web page on a display based on the specifying a display position of the web page on the display, wherein the word extract portion further extracts a peripheral word placed around the objective word, and a retrieval portion that performs web page retrieval using the objective and peripheral words.

11 Claims, 4 Drawing Sheets

FIG. 5

| TYPE OF IMPORTANCE | FACTOR |
|---|---|
| $E_o(w)$ : IMPORTANCE OF WORD ITSELF | $F_m(w)$ : MEANING (PLACE NAME, PERSONAL NAME ETC) <br> $F_v(w)$ : DISPLAY (BRACKET, EMPHASIS) |
| $E_r(w|w_a)$ : IMPORTANCE OF OBJECTIVE WORD | $F_c(w, w_a)$ : COOCCUR (COOCCUR FREQUENCY WITH OBJECTIVE WORD) <br> $F_d(w, w_a)$ : DISTANCE (CHARACTER NUMBER FROM OBJECTIVE WORD) |

$w_a$ : OBJECTIVE WORD    $w$ : PERIPHERAL WORD

INFORMATION RETRIEVAL APPARATUS AND COMPUTER PROGRAM

BACKGROUND OF THE INVENTION

1. Field of the Invention

The present invention relates to an information retrieval apparatus and a computer program that retrieve a file (web page).

Priority is claimed on Japanese Patent Application No. 2007-301984, filed Nov. 21, 2007, the content of which is incorporated herein by reference.

2. Description of Related Art

In recently years, a web system that makes information widely available using the internet has been sufficiently realized, and a lot of information can be browsed. Therefore, a technology for simply retrieving useful information becomes important. For example, a method for retrieving a similar web page based on the text information of an entire web page is disclosed in Japanese Unexamined Patent Application, First Publication, No. 2006-236221. In another method disclosed in a Non-Patent document, when an user selects and traces a retrieval keyword displayed on a touch panel by drug operation of a pen using an input interface with the touch panel and the pen, a retrieval system (search engine) provides the user with a retrieval intention menu (requirement for seeing a map, a press release, or the like) in response to the selected keyword and the type of peripheral word such as enterprise, facility, or the like (refer to "Successive Information Retrieval Method with Pen-based Interaction based on Estimation of User Intention", Masaru Suzuki, Kosei Fume and Yasuto Ishitani, Proceedings of Interaction 2006, pp. 101-108, March 2006, in Japanese).

However, a minimum unit that can be specified by the user is the entire web page and the user can not specify to which keyword on the web page attention should be made, in the prior art of JP2006-236221A.

There is a problem in the prior art of the above Non-Patent document that, although the user enables specification of the keyword, highlighting an object on a touch panel is annoying. Furthermore, an operation to specify the keyword is not easy in a terminal, like a cellular phone, having an only limited input interface or device such as a numeric keypad, a direction key and so on. In fact, a household appliance such as TV game having functions of internet access and web browser, a car navigation system, and the like have been recently realized. The input operation is usually made by a small remote control apparatus in such appliances. In general, since the remote controller only has the limited input interface such as the numeric keypad, a direction key and the like, the operation to specify the keyword on a display is annoying.

SUMMARY OF THE INVENTION

The present invention was achieved in view of the above circumstances, and has as its object to provide an information retrieval apparatus and a computer program that simplify the user operation for specifying the keyword, and enable enhancement the retrieval accuracy.

An information retrieval apparatus for a web page retrieval using a retrieval keyword according to the first aspect of the present invention includes a word extract portion that extracts a first word from a web page on a display based on the specifying a display position of the web page on the display. In the information retrieval apparatus the word extract portion further extracts a second word placed around the first word.

The information retrieval apparatus of the present invention may further include a retrieval portion that performs the web page retrieval using the first and second words.

The information retrieval apparatus of the present invention may further include a word importance calculation portion that calculates importance of the second word based on the importance of the second word itself and related to the first word.

In the information retrieval apparatus of the present invention, the word importance calculation portion may determine a second word used for the web page retrieval together with the first word based on the importance of the second word.

In the information retrieval apparatus of the present invention, the word importance calculation portion may validate the importance of the second word itself when the second word belongs to a proper noun.

In the information retrieval apparatus of the present invention, the word importance calculation portion may validate the importance of the second word itself when the second word is made to an emphasis expression.

In the information retrieval apparatus of the present invention, the word importance calculation portion may calculate the importance of the second word related to the first word from a relationship between a frequency of cooccurrence with the first word and a distance from the first word on the display.

In the information retrieval apparatus of the present invention, a ratio of the importance of the second word itself to the importance of the second word related to the first word in the importance of the second word may be arbitrary controlled.

The information retrieval apparatus of the present invention may further include an evaluation result database that stores an evaluation result of the web page retrieval. In the information retrieval apparatus, the retrieval portion exhibits the result of the web page retrieval based on the stored evaluation result.

The information retrieval apparatus of the present invention may further include an evaluation input portion to which the evaluation is input.

In the information retrieval apparatus of the present invention, the evaluation may be input by selecting a stepwise value.

The information retrieval apparatus of the present invention may further include a database that stores a word leading to information of a specific genre. In the information retrieval apparatus, the database adds the word leading to the information of the specific genre to the first and second words.

The information retrieval apparatus of the present invention may further includes an information filter that avoids accessing the information of the specific genre. In the information retrieval apparatus, the information filter filters the first and second words.

The information retrieval apparatus of the present invention may further include a pointing device that specifies the display position of the web page on the display.

An information retrieval computer program for a web page retrieval using a retrieval keyword according to a second aspect of the present invention includes extracting a first word from a web page on a display based on the specifying a display position of the web page on the display, extracting a second word placed around the first word, and performing web page retrieval using the first and second words.

BRIEF DESCRIPTION OF THE DRAWINGS

FIG. 5 is a table that explains factors included in an importance of a peripheral word according to the embodiment of the present invention.

DETAILED DESCRIPTION OF THE INVENTION

An embodiment of the present invention will be described hereinbelow with reference to the drawings.

Figure 1:
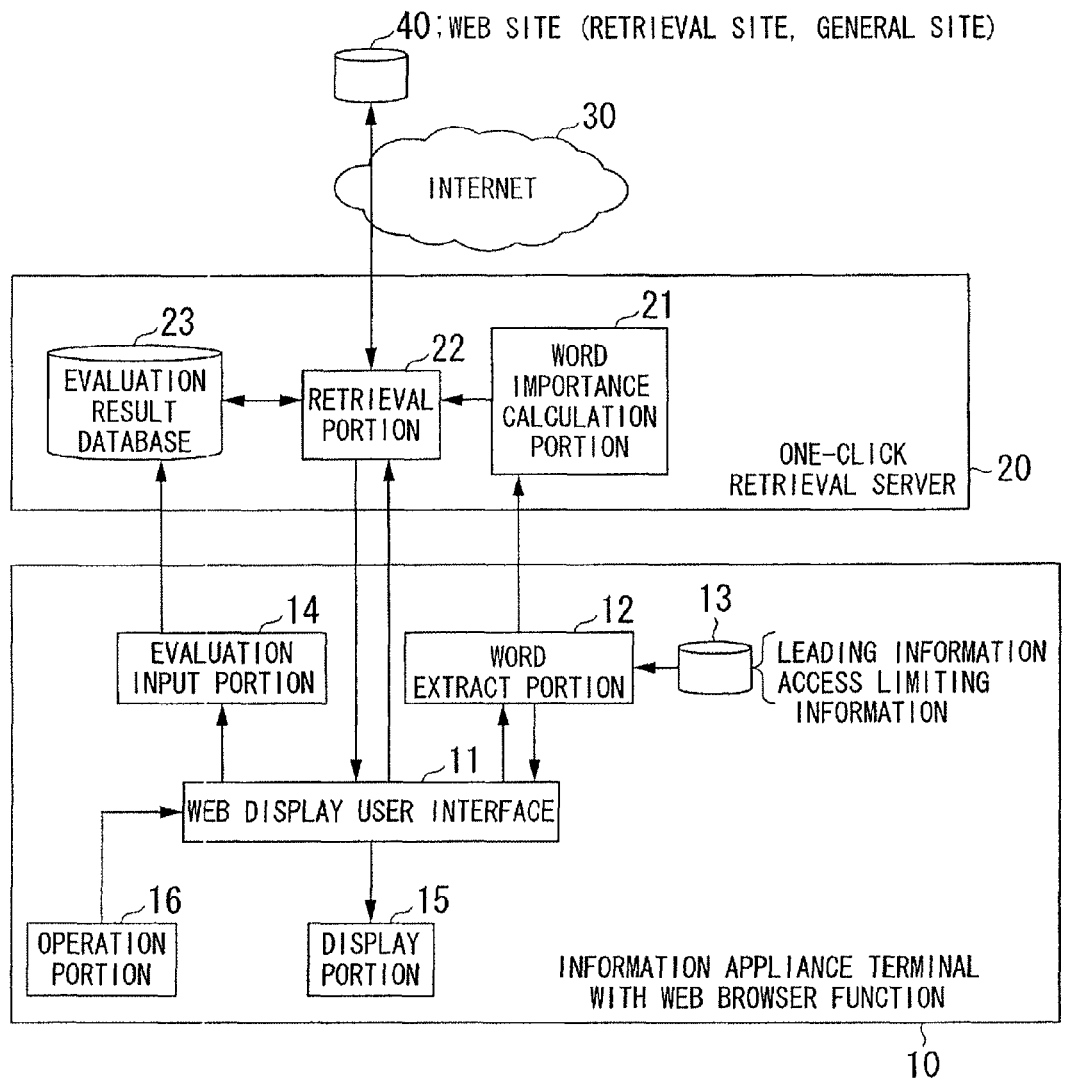
FIG. 1 is a block diagram that shows the entire configuration of an information retrieval apparatus according to an embodiment of the present invention.

FIG. 1 shows the entire configuration of an information retrieval apparatus according to the embodiment of the present invention. As shown in FIG. 1, the information retrieval apparatus includes an information appliance terminal 10 and a one-click retrieval server 20. The information appliance terminal 10 connects with the one-click retrieval server 20 through a communication line such as the internet or the like.

The information appliance terminal 10 has functions of internet access and web browsing. The information appliance terminal 10 includes, for example, a television, a video game machine, a set top box (STB), and the like. Alternately the information appliance terminal 10 may include a portable terminal such as an on board car navigation system, a cellular phone, personal digital assistants (PDA), and the like.

The one-click retrieval server 20 accesses a web site 40 provided on an internet 30 so as to retrieve a web page. In the web page retrieval, the one-click retrieval server 20 may directly access a general site opening the web page, or access a search site providing a retrieval service of the web page.

The information appliance terminal 10 includes a web display user interface 11, a word extract portion 12, a database 13, an evaluation input portion 14, a display portion 15, and an operation portion 16.

The web display user interface 11 provides a user interface (UI) during the web page retrieval and display. The word extract portion 12 extracts a word of the retrieval keyword from the web page, based on the keyword specified by the user. The word extract portion 12 extracts an objective word (in other words, main word) which is directly selected by the user, and a peripheral word (in other words, sub-word) which is placed around the objective word. The database 13 stores additional information concerning the web page retrieval. The evaluation input portion 14 inputs a user evaluation for the retrieval result of the web page.

The display portion 15 includes a display device such as a liquid crystal display device and the like, and displays the web page. The display portion 15 may be used as a unit that displays information other than the web page (for example, image of television program and the like). The operation portion 16 is an input interface during the web page retrieval and evaluation thereof. The operation portion 16 may be used as a unit that operates a function other than web page retrieval and evaluation thereof (for example, channel operation of a television or the like). The operation portion 16 may be provided in a main body of the information appliance terminal 10, or be a remote controller.

The operation portion includes an input device (hereinbelow referred to as a pointing device) that specifies a display position on the display of the display portion 15. The pointing device includes, for example, a mouse, a track ball, a stick-typed pointing device, a touch pad, a cursor key, and the like. The pointing device may have an input key for inputting a character of a numeric keypad, alphabet, and the like.

Figure 2:
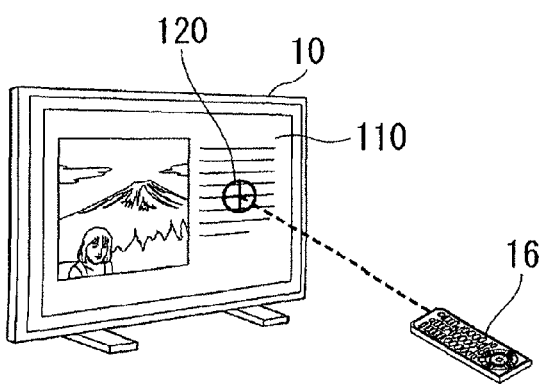
FIG. 2 is a schematic diagram that explains an input interface according to the embodiment of the present invention.

FIG. 2 explains an input interface according to the embodiment of the present invention. As shown in FIG. 2, the web page is displayed on a display 110 of the information appliance terminal 10 (for example, television). The operation portion 16 is a remote controller. This remote controller 16 has a pointing device by which the user can specify an arbitrary display position on the display 110. As shown in FIG. 2, a pointer 120 of cross shape shows the specified display position on the display 110. More particularly, the center of the cross shape (intersection part of the cross shape) is the specified position. Therefore, the user can easily specify the display position of the objective word (main word) in a text of the web page displayed on the display 110.

The one-click retrieval server 20 includes a word importance calculation portion 21, a retrieval portion 22, and an evaluation result database (evaluation result DB) 23. The word importance calculation portion 21 calculates an importance of the peripheral word in the words of the retrieval keyword (objective word and peripheral word) so as to determine the peripheral word used for the retrieval keyword together with the objective word. The retrieval portion 22 retrieves the web page using the retrieval keyword. The evaluation result database 23 stores the user evaluation to the web page of the retrieval result.

Figure 3:
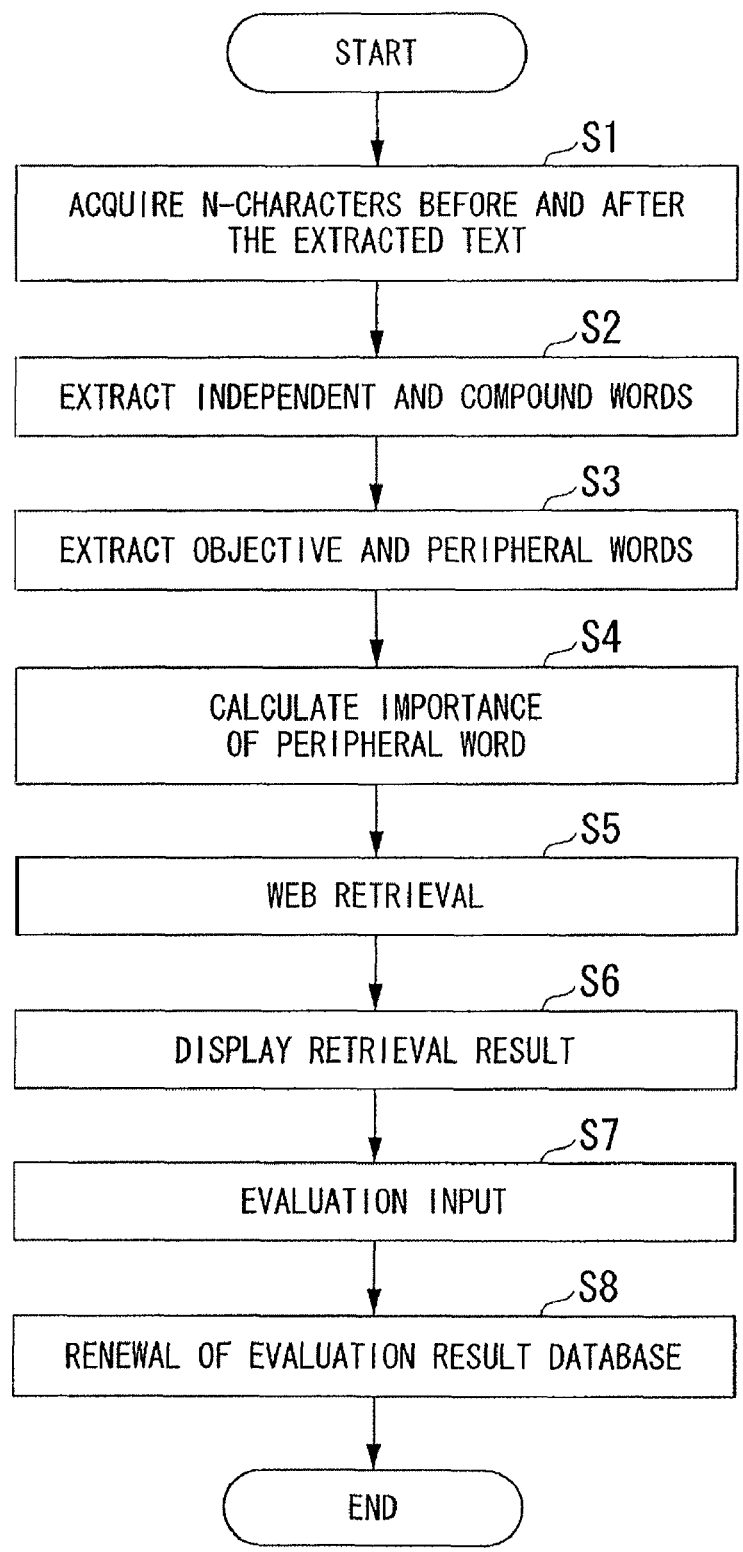
FIG. 3 is a flow chart that shows an information retrieval process made by an information retrieval system shown in FIG. 1.

Subsequently, operation of an entire information retrieval system according to the embodiment will be described with reference to FIG. 3. FIG. 3 shows an information retrieval process made by the information retrieval system shown in FIG. 1.

The information appliance terminal 10 is assumed to display a certain web page. This web page includes, for example, a default web page which is displayed immediately after the web browser starts, a web page to which the user accesses based on the link included in the default web page, and a web page of which the user saves a uniform resource locator (URL). The user retrieves the web page by selecting the objective word from the text of the displayed web page. Hereinbelow, this web page retrieval process will be described.

The user selects the objective word (main word) after instructing the web page retrieval through operating the operation portion 16 of the information appliance terminal 10. The user operates the pointing device of the operation portion 16 and moves the pointer to the displayed position of the objective word in the text of the web page displayed on the display portion 15 so as to specify, when the objective word is selected. This specified operation can be made, for example, by only one click of the mouse (one-click). For this reason, the selecting operation of the objective word is finished only by a moving operation of the pointer and one-click, and is quite easy. The process shown in FIG. 3 starts after the specified operation of the display position of the objective word.

Firstly the web display user interface 11 detects a character displayed at the nearest position of the pointer under the specified operation from the text of the displayed web page in step S1 shown in FIG. 3. Secondly, the word extract portion 12 extracts the character of each N-piece, which is placed before and after the extracted character, from the displayed web page. Thereby, an extracted character array, which is made of the detected character and the extracted character of each N-piece before and after thereof, is acquired. "N" is a predetermined number of characters. If "N" can be set arbitrarily, the user can specify an extraction range of the retrieval keyword.

In Step S2, the word extract portion 12 detects the word from the extracted character array, in which the word corresponds to an independent word and a compound word. A general morphological analysis tool can be used for this detection. Here, an example of a method of detecting the independent word and the compound word is described. Firstly, the word which belongs to a noun is detected using the morphological analysis tool. Secondly, the compound word is detected from among the detected noun. A detection rule of the compound word is that consecutive nouns are assumed to be the compound word, and delimitation is made immediately before the specific suffix such as a numerical classifier, or the like.

In step S3, the word extract portion 12 extracts the objective and peripheral words from the words detected from the extracted character array. The objective word includes the character in which the web display user interface 11 detects based on the pointer position in step S1. The peripheral word is other than the objective word in the extracted character array. The word extract portion 12 transfers the objective and peripheral words to the one-click retrieval server 20.

The word extract portion 12 may operate an additional process in the web page retrieval with reference to the database 13.

For example, the additional process includes adding a word leading information of a specific genre as the peripheral word. In this case, the leading information is saved in the database 13. The leading information is an assemblage of words leading to the information of the specific genre. The word extract portion 12 adds the word included in the leading information to the peripheral word, and then, transfers the objective and peripheral words to the one-click retrieval server 20.

Alternately, the additional process also includes limiting the word to avoid accessing the information of the specific genre. In this case, the access limiting information is saved in the database 13. The access limiting information is an assemblage of words to be excluded from the objective and peripheral words. The word extract portion 12 operates filtering that detects a word included in the access limiting information from the objective and peripheral words. The word extract portion 12 notifies the user of the results of the filtering. The word extract portion 12 deletes the word included in the access limiting information from the objective and peripheral words, and then, transfers the objective and peripheral words to the one-click retrieval server 20. When the objective word is deleted by filtering, the web page retrieval is ceased. Thereby, the accessing of improper information, such as harmful information and the like, can be obviated.

In step S4, the word importance calculation portion 21 of the one-click retrieval server 20 calculates the importance of the peripheral word among the objective and peripheral words received from the information appliance terminal 10, and determines the peripheral word used for the retrieval keyword together with the objective word. The importance of the peripheral word corresponds to a possibility that the retrieval result can be narrowed by using the objective word. The method of calculating the importance of the peripheral word will be described later. The peripheral words used for the retrieval keyword are sequentially selected from the high importance with a predetermined number.

In step S5, the retrieval portion 22 retrieves the web page using the objective word and peripheral word for the retrieval keyword.

In step S6, the retrieval portion 22 exhibits the web page arising from the retrieval result to the user, based on the retrieval result of the web page and the evaluation result database 23. The process of exhibiting the retrieval result will be described later. The retrieval portion 22 transfers the web page of the retrieval result to the information appliance terminal 10. The web display user interface 11 of the information appliance terminal 10 displays the web page of the retrieval result via the display portion 15. Thereby, the user can refer to the web page of the retrieval result.

In step S7, the web display user interface 11 of the information appliance terminal 10 displays an evaluation input picture which requires inputting an evaluation to the web page of the retrieval result via the display portion 15. The user operates the operation portion 16 so as to input the evaluation to the web page of the retrieval result in accordance with the content of the evaluation input picture. If the evaluation input picture is a menu and enables the user to select the evaluation content, the user has only to select the evaluation content by operating the pointing device of the operation portion 16, and hence, operation of the evaluation input becomes easy. For example, an evaluation value, which multi-stepwisely shows a satisfaction level (for example, 5 levels) to the web page of the retrieval result, can be selected. Thereby, the user multi-stepwisely evaluates how satisfied with the web page of the retrieval result they are, and can easily input the evaluation result thereof. The evaluation input portion 14 receives evaluation input data via the web display user interface 11, and then, transfers the data to the one-click retrieval server 20. The evaluation input data includes the URL of the web page to be evaluated, the evaluation value, and the objective word. The objective word is saved by the word extract portion 12.

Furthermore, a menu to which the user demands the other retrieval result is provided. When the user selects the menu to which the user demands the other retrieval result, the web display user interface 11 demands the other retrieval result from the retrieval portion 22. Thereby, the retrieval portion 22 transfers the web page of the other retrieval result to the information appliance terminal 10, and the web display user interface 11 displays the web page of the retrieval result via the display portion 15.

Alternately, when the evaluation result of the user is smaller than a predetermined value (for example, the evaluation result is smaller than the three stage of the five stage evaluation), the web display user interface 11 may automatically demand the other retrieval result from the retrieval portion 22.

In step S8, the evaluation result database 23 of the one-click retrieval server 20 receives the evaluation input data from the information appliance terminal 10, and renews or updates the database content. The evaluation result database 23 stores a set of URL of the web page to be evaluated, the evaluation value, and the objective word. The evaluation value, which is included in the set of URL of the web page to be evaluated and the objective word, is a statistic that reflects past user evaluation values and other user evaluation values, such as the past evaluation value, an average value of the other user, and the like.

Figure 4:
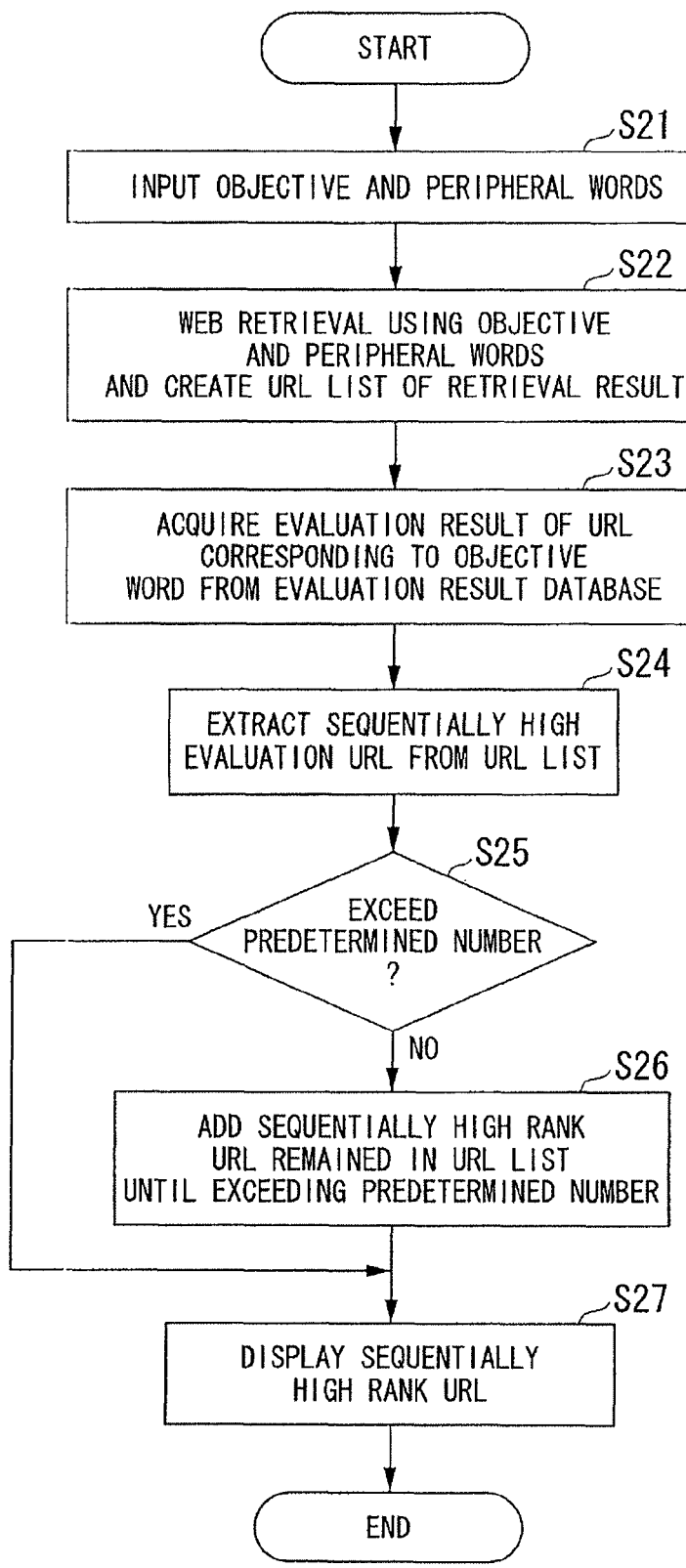
FIG. 4 is a flow chart that shows a process sequence made by a retrieval portion shown in FIG. 1.

Subsequently, the process of exhibiting the retrieval result according to the embodiment will be described with reference to FIG. 4. FIG. 4 shows a process flow of the retrieval portion 22 shown in FIG. 1. The process sequence receives the objective word and the peripheral word used for the retrieval keyword from the word importance calculation portion 21 in step S21 shown in FIG. 4.

In step S22, the web page retrieval is made by using the objective and peripheral words received in step S21. The retrieval keyword used for the web page retrieval includes the objective word, and a set of the objective and peripheral words. The set of the objective and peripheral words includes a set of the objective word and one peripheral word, and a set of the objective word and a plurality of the peripheral words. The set of the objective word and a plurality of the peripheral words includes a set of the objective word and the peripheral words sequentially selected from the high importance, and the like. Then, URL of the web page of the retrieval result is listed sequentially from the high rank of the retrieval result so as to create a URL list.

In step S23, the process sequence acquires the evaluation result of URL corresponding to the objective word from the evaluation result database 23. In step S24, the process sequence extracts URL sequentially from the high evaluation from the URL list, based on the evaluation result of URL acquired from the evaluation result database 23. In this manner, URL with the user evaluation is only extracted in sequential order of the high evaluation from the URL list. In this case, URL is sequentially extracted from the high rank position of the retrieval result when a plurality of URLs having the same evaluation value is placed in the URL list. URL with an evaluation value higher than a predetermined value may be only extracted. Furthermore, with respect to URL which is not placed in the URL list but has the user evaluation, since the corresponding web page may be absence, the set of the corresponding URL is deleted from the evaluation result database 23.

In step S25, the process sequence determines whether the number of URL extracted in step S24 is greater than a predetermined number or not. As a result, the process sequence comes into step S27 when the URL number has already exceeded the predetermined number. On the other hand, the process sequence comes into step S26 when the URL number has not exceeded the predetermined number. In step S26, the highest ranked URL remained in the URL list is sequentially extracted from the high rank position, and is added behind the URL which was already extracted until the URL number exceeds the predetermined number.

In step S27, the extracted URL is sequentially exhibited to the user starting with the highest rank position. As set forth, firstly the web page corresponding to the URL of the highest rank is transferred to the information appliance terminal 10. After that, the other web page is sequentially transferred to the information appliance terminal 10 whenever the user demands.

Subsequently, the method of calculating the importance of the peripheral word according to the embodiment will be described.

The importance of the peripheral word is defined as the degree of possibility that the retrieval result can be narrowed by the web page retrieval in which the peripheral word is combined with the objective word (main word, objective word). Therefore, the peripheral word preferable has high relevance to the meaning of the objective word.

In the embodiment, there are provided two aspects concerning importance, as follows: (1) the importance of the word itself (in other words, the peripheral word has an important meaning by itself); and (2) the importance related to the objective word (in other words, the relevance to the objective word is high). From both aspects, the importance of the peripheral word is calculated.

The equation (1) for calculating the importance is derived as;

$$E(w,w_a) = \alpha \cdot Eo(w) + (1-\alpha) \cdot Er(w|w_a) \tag{1}$$

where $E(w, w_a)$ at the left-hand side is the importance of a peripheral word w for an objective word $w_a$, $Eo(w)$ of the first term at the right-hand side is the importance of the peripheral word w itself, $Er(w|w_a)$ of the second term at the right-hand side is the importance of the peripheral word w related to the objective word $w_a$, $\alpha$ is the weighting factor that shows a summational ratio of $Eo(w)$ and $Er(w|w_a)$.

From the equation (1), the importance increases with increase of $E(w,w_a)$. The importance $E(w, w_a)$ of the peripheral word w is weighting summation of the importance $Eo(w)$ of the peripheral word w and the importance $Er(w|w_a)$ of the peripheral word w related to the objective word $w_a$. The weighting factor $\alpha$ can be arbitrary set by the user. Thereby, the user can adjust the tendency of the retrieval result.

FIG. 5 shows an example of each factor with respect to the importance $Eo(w)$ of the peripheral word w itself and the importance $Er(w|w_a)$ of the peripheral word w related to the objective word $w_a$. The factor of the importance $Eo(w)$ of the peripheral word w itself includes a meaning parameter $Fm(w)$ and a display parameter $Fv(W)$, where $Fm(w)$ shows a proper noun for easily restricting content of a document such as a place name, a personal name, and the like, while $Fv(w)$ shows a word which is intentionally expressed as important by an author of the web page, such as an emphasis expression, and the like. The factor of the importance $Er(w|w_a)$ of the peripheral word w related to the objective word $w_a$ includes a cooccurrence parameter $Fc(w, w_a)$ and a distance parameter $Fd(W)$, where $Fc(w)$ shows the frequency of cooccurrence with the objective word $w_a$, while $Fd(w)$ shows the distance calculated by the character number from the objective word $w_a$.

[Calculation Method of Eo(w)]

The equation (2) for calculating the importance $Eo(w)$ of the peripheral word w itself is expressed as;

$$E_o = F_m(w) + F_v(w) \tag{2}$$

As is shown in the equation (2), the importance $Eo(w)$ of the peripheral word w itself is the summation of the parameters $Fm(w)$ and $Fv(w)$, in which the parameters $Fm(w)$ and $Fv(w)$ are described by equations (3) and (4), respectively.

The equation (3) for calculating the meaning parameter $Fm(w)$ is expressed as;

$$F_m(w) = \begin{cases} 1 & (w \in D_M) \\ 0 & (w \notin D_M) \end{cases}, \tag{3}$$

where $D_M$ is the proper name dictionary.

The equation (4) for calculating the display parameter $Fv(w)$ is expressed as;

$$F_v(w) = \begin{cases} 1 & (w \in D_B) \\ 0 & (w \notin D_B) \end{cases}, \tag{4}$$

where $D_B$ is the code dictionary.

The code dictionary $D_B$ includes, for example, a bracket, an emphasis expression (<b>) by the hypertext markup language (HTML), and the like, which are frequently employed when the author of the web page intentionally expresses an importance. The proper name dictionary and the code dictionary are provided as the word importance calculation portion 21 can be employed.

As is shown in the equation (3), the parameter $Fm(w)$ is set to 1 when the peripheral word w is included in the proper name dictionary, while the parameter $Fm(w)$ is set to 0 when the peripheral word w is not included in the proper name dictionary. As is shown in the equation (4), the parameter $Fv(w)$ is set to 1 when the peripheral word w is included in the code dictionary, while the parameter $Fv(w)$ is set to 0 when the peripheral word w is not included in the code dictionary.

[Calculation Method of $Er(w|w_a)$]

The equation (5) for calculating the importance $Er(w|w_a)$ of the peripheral word w related to the objective word $w_a$ is derived as;

$$E_r(w|w_a) = \frac{F_c(w, w_a)}{F_d(w, w_a)}. \quad (5)$$

As is shown in the equation (5), the importance $Er(w|w_a)$ of the peripheral word w related to the objective word $w_a$ is a value of the parameter $Fc(w,w_a)$ divided by the parameter $Fd(w,w_a)$, in which the parameters $Fc(w,w_a)$ and $Fd(w,w_a)$ are described by equations (6) and (7), respectively.

The equation (6) for calculating the cooccurrence parameter $Fc(w,w_a)$ is expressed as;

$$F_c(w, w_a) = \frac{freq(w | dist(w, w_a) < k)}{freq(w | w \in Doc)}, \quad (6)$$

where the denominator is the total number of occurrence of the peripheral word w in a web page Doc in which the user selects the objective word $w_a$, the numerator is the number of cooccurrence of the peripheral word w with the objective word $w_a$ within a range of a character number k in the web page Doc, the character number k is the range for judgment for the cooccurrence of the peripheral word w with the objective word $w_a$.

The equation (7) for calculating the distance parameter $Fd(w,w_a)$ is expressed as;

$$F_d(w, w_a) = dist(w, w_a) \quad (7)$$

where the parameter $dist(w,w_a)$ is the character number between the peripheral word w and the objective word $w_a$, and shows the distance between the peripheral word w and the objective word $w_a$ in the display.

According to the embodiment as described above, the user can easily specify the objective word from the displayed web page through operating the pointing device of the operation portion 16 and specifying the display position of the web page on the display. Furthermore, the word placed around the objective word (peripheral word) is extracted, and used for the web page retrieval together with the objective word as a complement thereof. Therefore it is possible to prevent a deficiency of the retrieval keyword only being the objective word due to the simplified specification operation of the retrieval keyword by the user. As a result, it is possible to plan promotion of accuracy of the web page retrieval together with the simplified specification operation of the retrieval keyword by the user.

According to the embodiment, furthermore, the peripheral word used for the web page retrieval is selected together with the objective word, based on the importance of the peripheral word. Thereby, the peripheral word is selected, the web page is retrieved using the effective peripheral word, and hence, it is possible to plan for further promoting of the accuracy of the web page retrieval.

Moreover, the user evaluation for exhibiting the web page to the user is stored, so as to exhibit the retrieval result of the keyword to the user based on the stored evaluation. Thereby, it is possible to contribute to the exhibition of a fruitful web page to the user.

Furthermore, it is possible to extend the retrieval result by adding the word leading information of the specific genre to the objective and peripheral words.

Moreover, it is possible to avoid accessing of improper information such as harmful information and the like by providing the information filter that limits the word for preventing access to the specified genre to the objective and peripheral words. Thereby, it is possible to assist with the parental control.

The one-click retrieval server 20 according to the embodiment may be achieved by custom hardware. Alternately, the one-click retrieval server 20 may be made of a computer system such as a personal computer and the like, and achieve the function thereof by executing a program that achieves the function of each portion included in the one-click retrieval server 20 shown in FIG. 1.

The one-click retrieval server 20 is assumed to be connected to an input device and a display device (neither is illustrated) as peripheral devices. In this case, the input device can include a keyboard, a mouse, or the like. The display device can include a cathode ray tube (CRT), a liquid crystal display device, or the like.

The above peripheral device may connect with the one-click retrieval server 20 directly or via a communication line.

The information retrieval process may be performed through storing a program that achieves each step shown in FIGS. 3 and 4 in a storage medium of computer readable, and loading and executing the program stored in the storage medium into a computer system. The computer system may include an operating system (OS) and hardware like the peripheral device. The computer readable storage medium may include nonvolatile memory, such as flexible disks, magneto-optical disks, read only memory (ROM), flash memory or the like; a mobile medium such as digital versatile disks (DVD) or the like; and hard disks or the like included in the computer system.

Furthermore, the storage medium of computer readable maintains the program for a predetermined period like a volatile memory (for example, dynamic random access memory) in the computer system that plays a role of a server or a client when the program is transferred through a network such as the internet or the like, and a communication line such as a telephone line or the like.

Moreover, the program described above may be transferred from the computer system that stores the program in a storage device or the like to the other computer system via a transmission medium or a transmitted wave in the transmission medium. The transmission medium for transferring the program includes a medium that has a function of transferring information, such as the internet or the like (communication network) and the communication circuit of the telephone line or the like (communication line).

The above program may achieve a part of the function described above, and the function described above combined with the program which has already been stored in the computer system. That is, the program may be a differential file (differential program).

For example, the information appliance terminal 10 and the one-click retrieval server 20 are provided in the embodiment described above. Each function and deployment can be changed. The function of the information appliance terminal 10 and the one-click retrieval server 20 may be achieved within one device.

According to the present invention, an advantage can be obtained that simplifies the user operation to specify the keyword and enable enhancement of the retrieval accuracy.

Accordingly, while the preferred embodiment of the invention has been described and illustrated above, it should be understood that it is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A computer-executable information retrieval apparatus for a web page retrieval using a retrieval keyword comprising:
   at least one processor;
   a computer storage medium embedded with computer instructions executed by the at least one processor, the executed computer instructions comprising:
   a word extract portion that extracts a first word from a web page on a display based on a display position of said web page on said display, wherein the displayed position is specified by a user, said word extract portion further extracts a second word placed around said extracted first word, said extracted second word is different from said extracted first word and is determined by an importance;
   wherein the importance of said extracted second word is calculated by a word importance calculation portion, the word importance calculation portion calculates the importance of said extracted second word based on an importance of said extracted second word itself and related to said extracted first word, wherein the word importance calculation portion further calculating said importance of said extracted second word related to said extracted first word based on a relationship between a ratio of the number of cooccurrences of said extracted second word with said extracted first word within a range of a certain character number in said web page to the total number of occurrences of said extracted second word in said web page, and a distance from said first word to said second word on said display;
   a retrieval portion that retrieves at least one web page using said extracted first word and second word.

2. The computer-executable information retrieval apparatus as recited in claim 1, wherein said word importance calculation portion validates said importance of said extracted second word itself when said extracted second word belongs to a proper noun.

3. The computer-executable information retrieval apparatus as recited in claim 1, wherein said word importance calculation portion validates said importance of said extracted second word itself when said extracted second word is made to an emphasis expression.

4. The computer-executable information retrieval apparatus as recited in claim 1, wherein a ratio of said importance of said extracted second word itself and said importance of said extracted second word related to said extracted first word in said importance of said extracted second word is arbitrary controlled.

5. The computer-executable information retrieval apparatus as recited in claim 1, further comprising an evaluation result database that stores an evaluation result of said at least one web page, wherein said retrieval portion exhibits said result of said at least one web page based on said stored evaluation result.

6. The computer-executable information retrieval apparatus as recited in claim 5, further comprising an evaluation input portion to which evaluation is input.

7. The computer-executable information retrieval apparatus as recited in claim 6, wherein said evaluation is input by selecting a stepwise value.

8. The computer-executable information retrieval apparatus as recited in claim 1, further comprising a database that stores a word leading to information of a specific genre, wherein said database adds said word leading to said information of said specific genre to said extracted first and second words.

9. The computer-executable information retrieval apparatus as recited in claim 8, further comprising an information filter that avoids accessing said information of said specific genre, wherein said information filter filters said extracted first and second words.

10. The computer-executable information retrieval apparatus as recited in claim 1, further comprising a pointing device that specifies said display position of said web page on said display.

11. A storage medium storing an information retrieval computer program for a web page retrieval using a retrieval keyword, the computer program executed by at least one processor to perform the steps comprising:
    extracting a first word from a web page on a display based on a display position of said web page on said display, wherein the displayed position is specified by a user;
    extracting a second word placed around said extracted first word, said extracted second word is different from said extracted first word and is determined by an importance, wherein the importance of said extracted second word is calculated based on an importance of said extracted second word itself and related to said extracted first word, wherein said calculated importance of said extracted second word related to said extracted first word is further based on a relationship between a ratio of the number of cooccurrences of said extracted second word with said extracted first word within a range of a certain character number in said web page to the total number of occurrences of said extracted second word in said web page, and a distance from said first word to said second word on said display;
    retrieving at least one web page using said extracted first word and second word.

* * * * *